United States Patent [19]

Nowitzki et al.

[11] Patent Number: 5,391,530
[45] Date of Patent: Feb. 21, 1995

[54] CATALYST FOR REMOVING NITROGEN OXIDES FROM A WASTE GAS, AND PROCESS FOR THE PRODUCTION OF THE CATALYST

[75] Inventors: Bernd Nowitzki, Marl; Jürgen Jung, Dorsten; Helmut Kretschmer, Haltern, all of Germany

[73] Assignee: Huels Aktiengesellschaft - PB15, Marl, Germany

[21] Appl. No.: 93,688

[22] Filed: Jul. 20, 1993

[30] Foreign Application Priority Data

Sep. 2, 1992 [DE] Germany ............................... 4229255

[51] Int. Cl.$^6$ ........................ B01J 21/02; B01J 21/14; B01J 27/18; B01J 35/04
[52] U.S. Cl. .................. 502/204; 423/239.1; 502/202; 502/209; 502/210; 502/242; 502/247; 502/248; 502/439; 502/527
[58] Field of Search ............... 502/527, 439, 209, 210, 502/202, 204, 242, 247, 248

[56] References Cited

U.S. PATENT DOCUMENTS 4,134,733  1/1979  Volker et al. ....................... 502/527
4,294,806  10/1981  Abe et al. ........................... 423/239

FOREIGN PATENT DOCUMENTS 0473396  3/1992  European Pat. Off. .
2458888  6/1975  Germany .
2658539  7/1977  Germany .
2658569  7/1977  Germany .
2834358  2/1979  Germany .
2853023  6/1979  Germany .
2927253  3/1980  Germany .
3208634  9/1982  Germany .
54-71791  6/1979  Japan .
127631  5/1991  Japan ................................ 502/527

Primary Examiner—Paul E. Konopka
Attorney, Agent, or Firm—Oblon, Spivak, McClelland, Maier, & Neustadt

[57] ABSTRACT

The present invention relates to a process for the production of a catalyst for the removal of nitrogen oxides from waste gases, in which the end of the catalyst on the gas-inlet side is coated with a compound selected from the group consisting of biphosphates, condensed phosphates, silicates, borates and mixtures thereof, and is subjected to thermal aftertreatment, where the end of the green element on the gas-inlet side is immersed into an aqueous preparation comprising biphosphates and/or condensed phosphates and/or silicates and/or borates, and the green element is subsequently calcined at temperatures of from 300° to 700° C.

9 Claims, 3 Drawing Sheets

CATALYST FOR REMOVING NITROGEN OXIDES FROM A WASTE GAS, AND PROCESS FOR THE PRODUCTION OF THE CATALYST

BACKGROUND OF THE INVENTION

1. Field of the Invention

The present invention relates to a catalyst for the removal of nitrogen oxides from a waste gas and a process for the production thereof, in which the end of the catalyst precursor on the gas-inlet side is coated with a biphosphate, a condensed phosphate a silicate, a borate or a mixture thereof, then the coated catalyst precursor is subjected to a thermal aftertreatment. The present invention also concerns a process for removing nitrogen oxides from a waste gas, using the catalyst.

2. Discussion of the Background

The removal of nitrogen oxides from waste gases is of general importance in many industrial processes. For example, the burning of fossil fuels in power stations produces nitrogen oxides, which pass into the environment together with the flue gases.

In order to remove the nitrogen oxides from flue gases by selective catalytic reduction using ammonia as reducing agent, German Patent 2,458,888 employs catalysts based on high surface-area, porous titanium dioxides with further metal oxide or sulphate components. The catalyst types employed for the removal of nitrogen oxides have a multiplicity of parallel channels, the axes of which are aligned in the direction of the gas flow. The catalysts used are predominantly (1) monolithic with a honeycomb structure (see German Patent 2,658,569 and German Patent 2,658,539), or (2) catalyst packets comprising a multiplicity of individual plate-like structures (see German Patent 3,208,634, German Patent 2,853,023 and German Patent 2,927,253).

These catalysts are frequently operated in "high-dust" circuits, preferably at temperatures between 350° and 450° C. (see German Patent 2,658,539 and German Patent 2,834,358). The catalytic reactor in a high-dust circuit of this type is positioned upstream of a dust filter. The flue gas at this point contains a particularly large proportion of fly ash or fly dust, so that the catalyst for the removal of nitrogen oxides is subjected to considerable abrasion caused by fly ash, predominantly from the flow side. This significantly reduces the service life of the catalyst.

JP-A 79/71791 discloses a fixed-bed catalyst, provided with through-holes in the gas flow direction. At least one front end of the catalyst on the gas-inlet side is coated with a substance whose principal component comprises biphosphate, condensed phosphate or metaphosphate, and is heated in order to reinforce this.

According to Example 1 of JP-A 79/71791, a honeycomb element is shaped from a titanium dioxide-based catalyst composition by extrusion. The shaped element is dried, then calcined at 500° C. After this production process, one end (i.e., the later flow side of the catalyst) is subsequently immersed into an aqueous preparation of aluminum biphosphate, and the catalyst is re-dried and re-calcined at 500° C.

The additional application of a layer of this type, which reinforces the catalyst structure on the flow side, significantly improves the abrasion resistance and the service life of the catalyst under high-dust conditions. However, experience has shown that the process for the production of a catalyst according to JP-A 79/71791 is time-consuming and expensive. Furthermore, although direct incorporation of the reinforcing component (for example, aluminum biphosphate) into the catalyst composition before shaping allows an improvement in the catalyst strength, the catalytic activity of the entire catalyst drops significantly at the same time.

SUMMARY OF THE INVENTION

Accordingly, one object of the present invention is to provide a novel process for the production of a catalyst for removing nitrogen oxides from a waste gas, in which the catalyst is provided with high abrasion resistance.

It is a further object of the present invention to provide a catalyst having high abrasion resistance, for removing nitrogen oxides from a waste gas.

It is a further object of the present invention to provide a novel process for removing nitrogen oxides from a waste gas, in which a catalyst having high abrasion resistance is used, reducing the number of occasions per unit time needed to replace or repair the catalyst.

It is a further object of the present invention to provide a novel process for producing a catalyst for removing nitrogen oxides from waste gas, in which the catalyst is produced in a less time-consuming and less expensive manner.

Surprisingly, it has now been found that an abrasion-resistant catalyst can be produced from a corresponding green element in a much less time-consuming and expensive manner by immersing the gas-inlet end of the green element into an aqueous preparation of at least one biphosphate, condensed phosphate, silicate, borate, or mixture thereof, and subsequently calcining the immersed green element at a temperature of from 300° to 700° C.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

BRIEF DESCRIPTION OF THE PREFERRED EMBODIMENTS

Figure 1:
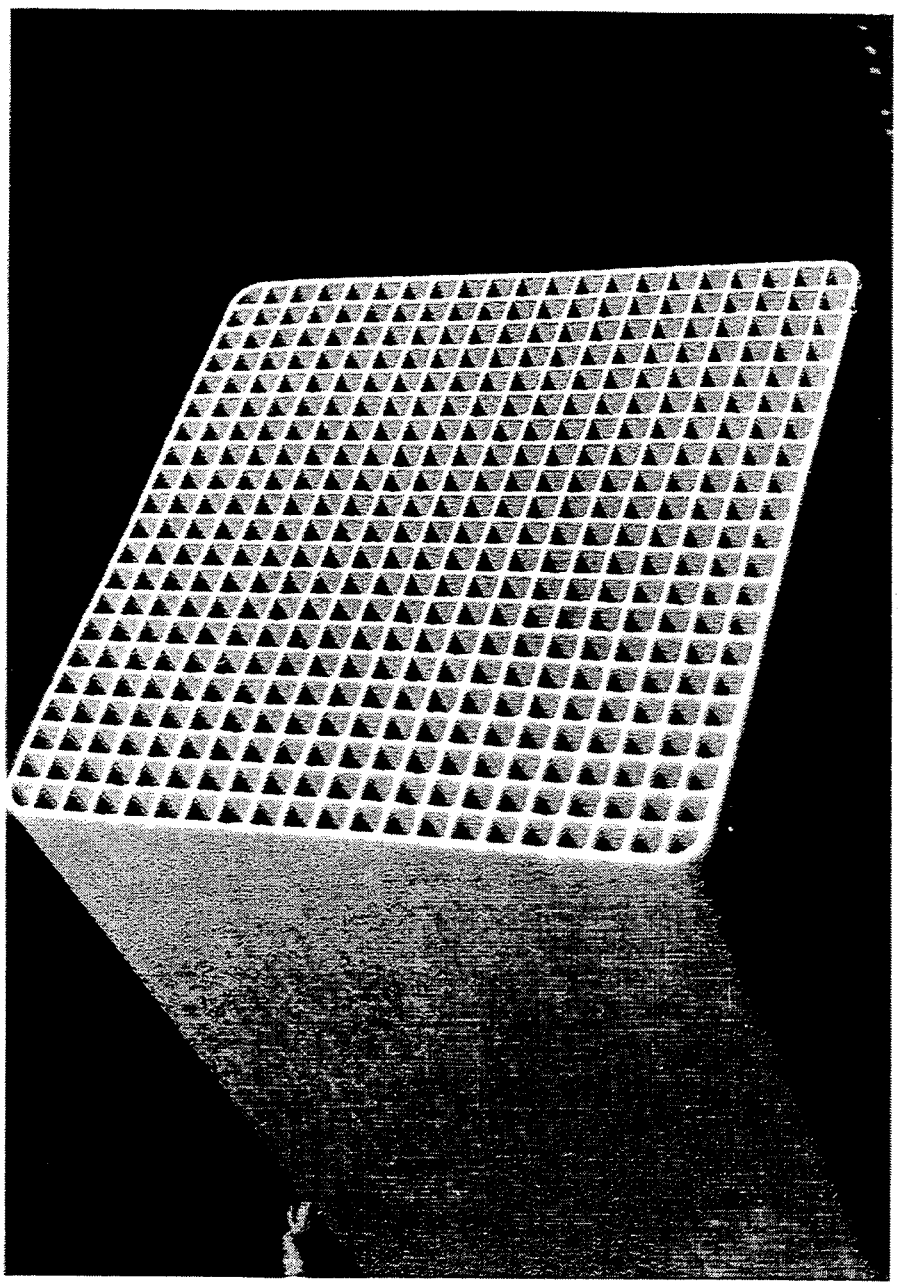
FIG. 1 shows the flow side of a honeycomb catalyst prepared according to Example 1 infra before an abrasion test.

The present invention therefore relates to a process for the production of a catalyst for removing nitrogen oxides from waste gas comprising coating the end of the catalyst on the gas-inlet side with one or more biphosphates, condensed phosphates, silicates, borates or mixtures thereof, and subjecting the coated catalyst to thermal aftertreatment. The coating step comprises immersing the end of the green element on the gas-inlet side into an aqueous preparation of one or more biphosphates, condensed phosphates, silicates, borates, or mixtures thereof. The thermal aftertreatment preferably comprises calcining the green element at a temperature of from 300° to 700° C.

The term "green element" means the dried, shaped catalyst which has not yet been calcined. The shaped, but as yet undried, catalyst is referred to as a "shaped element."

The catalyst produced according to the present invention is preferably employed for the removal of nitrogen oxides from waste or flue gases. Accordingly, a further aspect of the present invention concerns a method of removing nitrogen oxides from a waste gas or a flue gas, comprising passing the waste gas or flue gas through a catalyst in which the end on the gas-inlet side is coated with an aqueous preparation of one or more biphosphates, condensed phosphates, silicates, borates or mixtures thereof, then the coated catalyst is calcined.

Suitable compounds for incorporating into the aqueous preparation into which the end of the green element on the gas-inlet side is immersed include biphosphates, a wide variety of condensed phosphates, silicates and borates. More specifically, suitable examples include aluminum biphosphate, aluminum metaphosphates, magnesium biphosphate, magnesium silicate precursor compounds such as water-soluble magnesium salts (for example, magnesium nitrate), pyrogenically prepared silica, sodium silicate (for example, sodium water glass), and sodium borates, such as borax. The end of the green element on the gas-inlet side is preferably immersed into an aqueous preparation comprising aluminum biphosphate, condensed aluminum phosphates, sodium silicate or a mixture thereof. It is also suitable to immerse the end of the green element on the gas-inlet side into an aqueous preparation comprising sodium silicate, precursor compounds for the formation of magnesium silicates or a mixture thereof.

The "gas-inlet side" refers to the face of the shaped catalyst, green element and/or end-product catalyst (collectively, the "catalyst") into which a waste gas or a flue gas enters, as the waste gas or flue gas comes into contact with the catalyst. The "end" of the gas-inlet side refers to that part of the catalyst which includes the gas-inlet side and the material thereunder, to a selected depth, preferably of up to about 10 cm. The catalyst itself preferably has a length of from about 15 cm to about 2,000 cm, more preferably of from about 50 cm to about 1,000 cm.

The present catalyst contains a predominant amount of porous titanium dioxide. However, other compunds, such as oxides of tungsten and/or vanadium may be present. Other compounds and inert materials can be present and/or can be incorporated into the catalyst, such as clays and glass fibers. In the present process for producing a catalyst, porous titanium dioxide is formed into any of a very wide variety of shapes, such as, for example, a honeycomb or a sheet shape, according to conventional processes. The shaped elements made therefrom are subjected to a subsequent drying step in the production process. This forms the green element.

In the production process according to the present invention, the green elements are then immersed at the end on the gas-inlet side, i.e. at the later flow side of the catalyst, into an aqueous preparation comprising one or more biphosphates, condensed phosphates, silicates, borates or mixtures thereof, preferably to a depth of from 0.5 to 10 10 cm.

The viscosity of the aqueous preparation used according to the present invention is adjusted via its water content so that the green element to be immersed, which has only been consolidated by drying, does not dissolve. During immersion, a sufficiently thick layer of the aqueous preparation which reinforces the end of the green element on the gas-inlet side, i.e., the later flow side of the catalyst, is applied or penetrates into the relatively porous material of the green element. The green element pretreated in this way is subsequently calcined at a temperature of from 300° to 700° C., preferably at a temperature of from 430° to 580° C.

The present invention also concerns a process for removing nitrogen oxides from a waste gas or flue gas, comprising contacting said waste gas or flue gas with a catalyst prepared by a process comprising the steps of immersing an end of a green element into which a gas enters into an aqueous preparation comprising a biphosphate, a condensed phosphate, a silicate, a borate, or a mixture thereof to form a coated green element, and heating said coated green element at a temperature of from 300° to 700° C.

The process for removing nitrogen oxides from a waste gas or flue gas may also incorporate a step in which the waste gas or flue gas is mixed with a reducing gas, such as ammonia, prior to or during the contacting step. The waste gas or flue gas is preferably at a temperature of from 200° to 500 ° C. when contacted with the catalyst. Preferably, contacting comprises passing the waste gas or flue gas into the the gas inlet end of the catalyst through the length of the catalyst, where the nitrogen oxides are converted to non-toxic gases, such as, for example, nitrogen and water. The waste gas or flue gas is preferably passed through the catalyst at a rate sufficient to essentially completely convert nitrogen oxides to non-toxic gases. The rate may be determined empirically by conventional means, and may be based on factors such as concentration of nitrogen oxides in the waste or flue gas, available surface area of the catalyst for contacting with the gas, length of contact time, pore size of the catalyst, etc.

Other features of the invention will become apparent in the course of the following descriptions of exemplary embodiments which are given for illustration of the invention and are not intended to be limiting thereof.

EXAMPLE 1

(Comparative example)

Metatitanic acid, an intermediate in the preparation of titanium dioxide by the sulphuric acid process, was neutralized, washed with demineralized water, partially peptized using nitric acid and converted into an activated titanium dioxide of the anatase type by calcination for 5 hours at 450° C. The resultant material was ground to give particle fractions of from 2 to 12 $\mu$m.

A solution of 24 kg of ammonium metatungstate in 40 kg of demineralized water and a solution of 19.4 kg of ammonium metavanadate in 45 kg of monoethanolamine were compounded in a mixer unit together with 213 kg of activated titanium dioxide powder, 16 kg of E-glass fibers (diameter 13 $\mu$m, length 4.5 mm), 7 kg of high-molecular-weight polyethylene glycol and a further 85 kg of demineralized water. The compounded mixture was extruded in a vacuum extruder through an extrusion die to give shaped elements, which were then predried and then dried for 16 hours at 100° C. The green elements produced in this way were subsequently calcined for 5 hours at 480° C. in an electrically heated or gas-fired furnace. The honeycomb catalyst produced in this way had an axial length of 500 mm, a cross-section of 150×150 mm, a square cell pitch of 7.1 mm, internal walls having a thickness of 1.00 mm and external walls having a thickness of 1.7 mm.

In order to test the abrasion resistance of the honeycomb catalyst, in each case a complete honeycomb element was placed in a flow apparatus, and a stream of air carrying a concentration of quartz sand (particle size=100–300 μm) of from 50 to 60 g/m$^3$ of air was blown against the end of the honeycomb on the gas-inlet side at an angle of 45° for 8 hours at a flow rate of 17 m/s and at a temperature of from 40° to 50° C. In the abrasion test, the honeycomb catalyst lost up to 4% by weight of catalyst mass.

Figure 2:
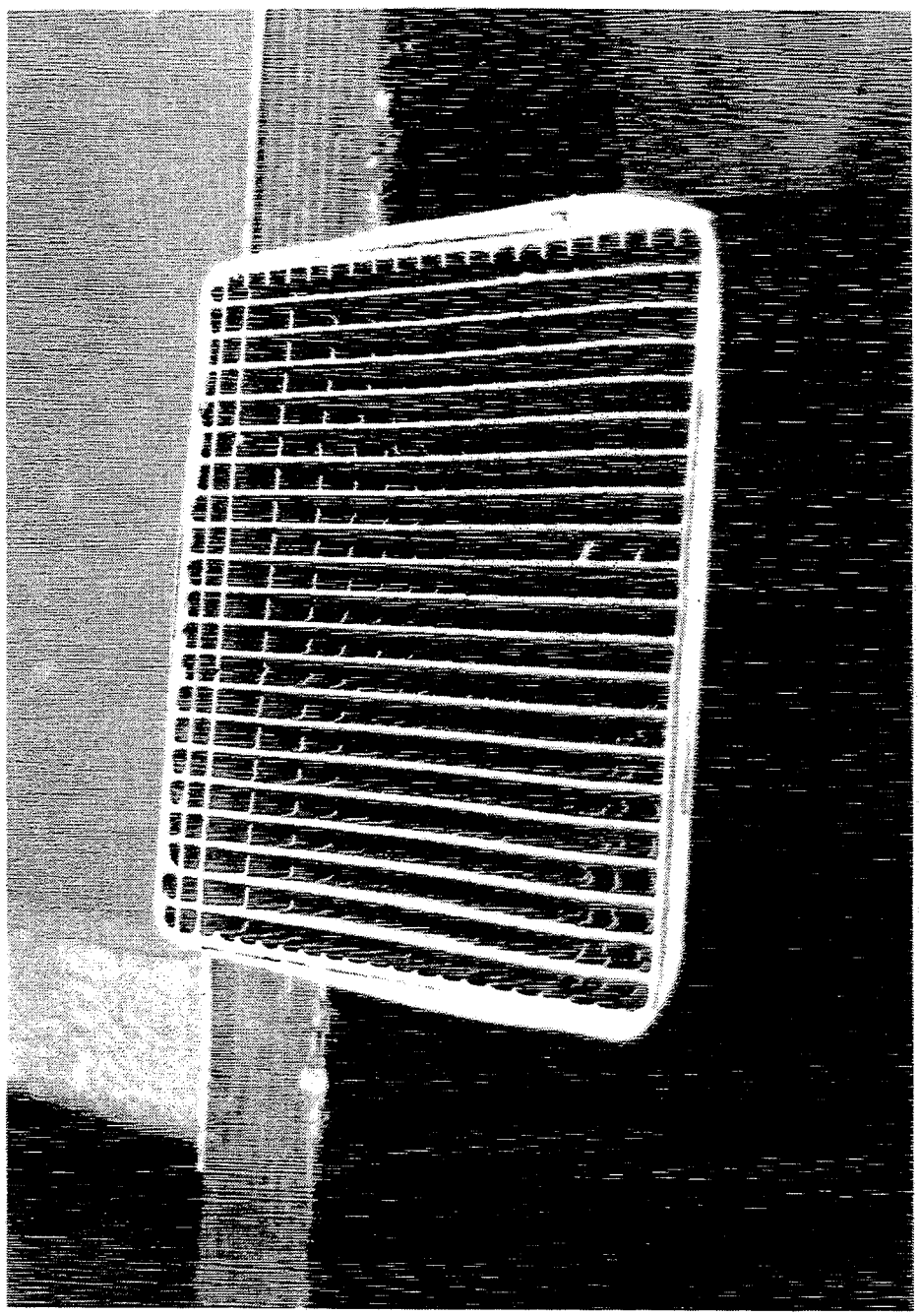
FIG. 2 shows the honeycomb catalyst from Example 1 after the abrasion test.

FIG. 1 shows the flow side of a honeycomb catalyst before the abrasion test. FIG. 2 shows the same honeycomb catalyst after the abrasion test. It can clearly be seen that many "webs" have eroded away.

EXAMPLE 2

An aluminum phosphate preparation was prepared from 50.8 kg of aluminum hydroxide (Martinswerke), 120.4 kg of demineralized water and 211.4 kg of o-phosphoric acid (75% strength). The mixture was heated at from 50° to 80° C. for 6 hours to provide a preparation having a viscosity of 120 mPas, measured by the Brookfield technique.

A shaped element was produced according to Example 1 and dried to form a green element, which was immersed at the end on the gas inlet side into the aluminum phosphate preparation to a depth of 3 cm for from 30 to 60 seconds. The immersed green element was removed, and briefly exposed to a stream of compressed air. The green element treated in this way was then calcined for 5 hours at 480° C. in an electrically heated or gas-fired furnace.

Figure 3:
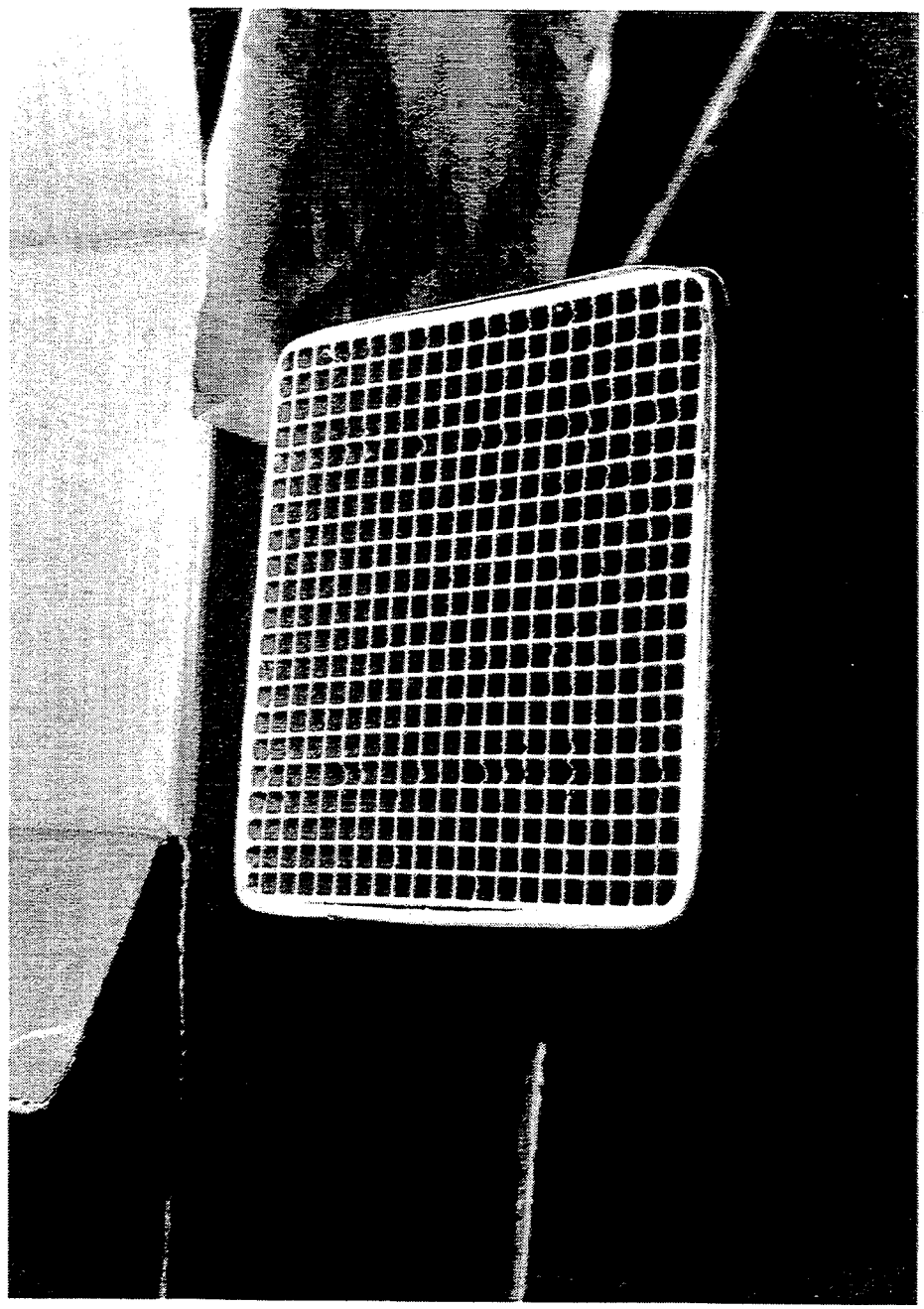
FIG. 3 shows the flow side of the honeycomb catalyst from Example 2 infra according to the present invention after an abrasion test.

The honeycomb catalyst according to the present invention, reinforced in this way on the flow side, lost less than 1% by weight of catalyst mass in the abrasion test of Example 1, cf. FIG. 1 and FIG. 3. FIG. 3 shows the flow side of the honeycomb catalyst of Example 2, prepared according to the present invention, after the abrasion test. The honeycomb catalyst according to the present invention shows virtually no erosion damage.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the production of a catalyst for removing nitrogen oxides from a waste gas, comprising the steps of:
   a) mixing a member selected from the group consisting of a tungstate, a vanadate and mixture thereof with a titanium oxide,
   b) shaping a mixture comprising the product of step a),
   c) drying the shaped product of step b) to form a green element,
   d) immersing a gas-inlet side of said green element into an aqueous preparation comprising an inorganic material selected from the group consisting of a biphosphate, a condensed phosphate, a silicate, a borate, and a mixture thereof to form a coated green element, and
   e) heating said coated green element at a temperature of from 300° to 700° C.

2. The process of claim 1, wherein said aqueous preparation comprises an inorganic material selected from the group consisting of aluminum biphosphate, one or more condensed aluminum phosphates, and a mixture thereof.

3. The process of claim 1, wherein said gas-inlet end of the green element is immersed into an aqueous preparation comprising an inorganic material selected from the group consisting of sodium silicate, one or more precursor compounds for the formation of magnesium silicates, and mixtures thereof.

4. The process of claim 1, wherein said heating is conducted at a temperature of from 430° to 580° C.

5. The process of claim 1, wherein said green element is immersed to a depth of from 0.5 to 10 cm.

6. A catalyst for removing nitrogen oxides from a waste gas, prepared by a process comprising the steps of:
   a) mixing a member selected from the group consisting of a tungstate, a vanadate and mixture thereof with a titanium oxide,
   b) shaping a mixture comprising the product of step a),
   c) drying the shaped product of step b) to form a green element,
   d) immersing a gas-inlet side of said green element into an aqueous preparation comprising an inorganic material selected from the group consisting of a biphosphate, a condensed phosphate, a silicate, a borate, add a mixture thereof to form a coated green element, and
   e) heating said coated green element at a temperature of from 300° to 700° C.

7. The catalyst of claim 6, wherein said aqueous preparation comprises an inorganic material selected from the group consisting of an aluminum biphosphate, condensed aluminum phosphates, sodium silicate and a mixture thereof.

8. The catalyst of claim 6, wherein said aqueous preparation comprises an inorganic material selected from the group consisting of sodium silicate, precursor compounds for the formation of magnesium silicates and a mixture thereof.

9. The catalyst of claim 5, wherein said green element is immersed to a depth of from 0.5 to 10 cm.

* * * * *